(12) United States Patent
Kearney et al.

(10) Patent No.: US 7,789,265 B2
(45) Date of Patent: Sep. 7, 2010

(54) TAB STRUCTURE FOR CONTROLLING CUPS IN VEHICLES

(75) Inventors: Christian Kearney, Upper Arlington, OH (US); Tadashi Yoda, Columbus, OH (US)

(73) Assignee: Honda Motor Co., Ltd., Toyota (JP)

( * ) Notice: Subject to any disclaimer, the term of this patent is extended or adjusted under 35 U.S.C. 154(b) by 299 days.

(21) Appl. No.: 11/956,007

(22) Filed: Dec. 13, 2007

(65) Prior Publication Data
US 2009/0152285 A1 Jun. 18, 2009

(51) Int. Cl.
*B65D 25/00* (2006.01)
*B60R 7/00* (2006.01)
*A47B 96/06* (2006.01)

(52) U.S. Cl. ............... 220/737; 224/926; 248/311.2
(58) Field of Classification Search ............ 220/720, 220/737; 224/296; 248/311.2
See application file for complete search history.

(56) References Cited

U.S. PATENT DOCUMENTS

| | | | |
|---|---|---|---|
| 5,072,909 A | 12/1991 | Huang | |
| 6,039,296 A | 3/2000 | Nishina et al. | |
| 6,076,793 A | 6/2000 | Yamamoto | |
| 6,230,948 B1 | 5/2001 | Steiger et al. | |
| 6,253,975 B1 | 7/2001 | Ichioka et al. | |
| 6,427,961 B1 | 8/2002 | Dieringer et al. | |
| 6,578,806 B2 | 6/2003 | Dieringer et al. | |
| 6,702,243 B2 | 3/2004 | Takeichi | |
| 6,705,580 B1 | 3/2004 | Bain | |
| 6,860,457 B2 | 3/2005 | Then et al. | |
| 7,147,192 B2 | 12/2006 | Kong | |
| 7,165,752 B2 | 1/2007 | Dobos | |
| 7,168,669 B2 | 1/2007 | Park | |
| 2005/0279752 A1 * | 12/2005 | Harada | 220/759 |
| 2006/0032856 A1 | 2/2006 | Shin | |
| 2006/0186283 A1 | 8/2006 | Liu et al. | |

FOREIGN PATENT DOCUMENTS

DE 101 12 649 A1 10/2002

* cited by examiner

*Primary Examiner*—Harry A Grosso
(74) *Attorney, Agent, or Firm*—Mark E. Duell; Rankin Hill & Clark, LLP

(57) ABSTRACT

A cup holder with a securing mechanism for use in a vehicular cup holder for receiving and securing different sized cups. The cup holder includes a cylindrical opening defined by a cylindrical wall and bottom wall, tab openings formed in the cylindrical wall, tabs projecting through the openings, and a biasing device for biasing the tabs. The tabs are attached to the cup holder so as to be movable in a horizontal direction and to be rotatable in a vertical direction about a central pivot point. The tabs are biased so as to project fully into the cylindrical opening and to be in a non-pivoted position.

20 Claims, 4 Drawing Sheets

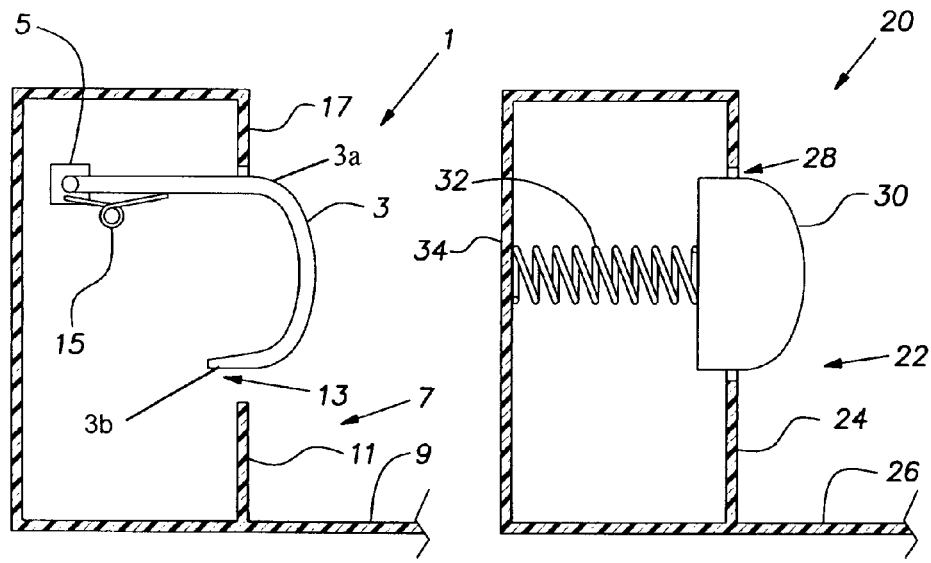
FIG. 1A (PRIOR ART)
FIG. 1B (PRIOR ART)
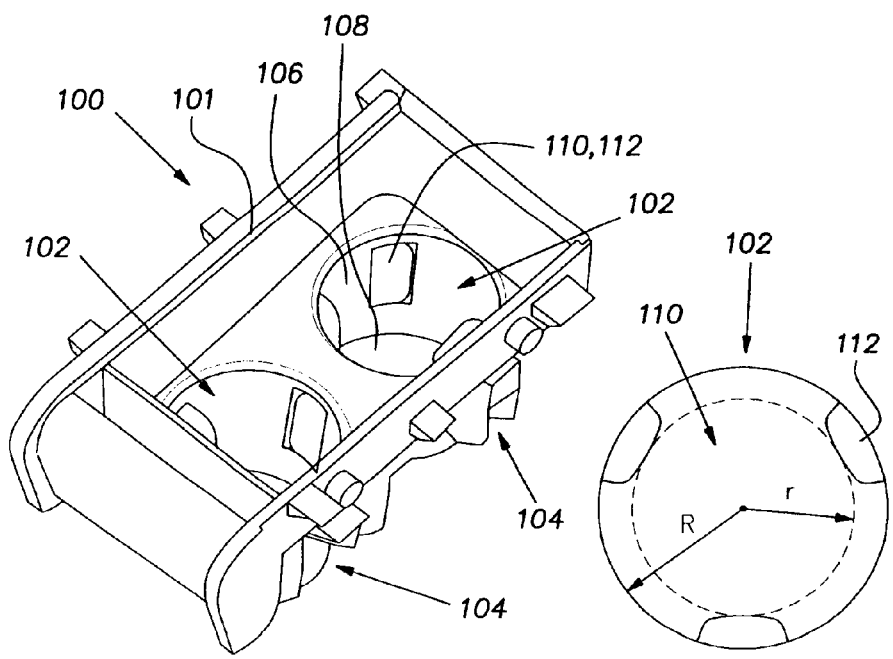
FIG. 2A
FIG. 2B

TAB STRUCTURE FOR CONTROLLING CUPS IN VEHICLES

BACKGROUND OF THE INVENTION

The present invention relates to a cup holder in a vehicle. Conventionally, cup holders are located in a center console for the driver and front seat passenger and somewhere along the back of the front seats or in a rear console or arm rest for passengers in the rear of the vehicle. The cup holders are generally provided by a plastic or rubber cylindrical opening within the interior trim of the vehicle. The cylindrical opening generally has a diameter designed to receive a cup with an average diameter.

A problem with conventional cup holders arises when a cup having a smaller or larger than average diameter is inserted into the cup holder. When a cup has a smaller than average diameter, the cup holder opening is too big for the cup. This leads to the cup not being properly secured within the cup holder, creating a risk of the cup tipping over. When the cup has a diameter larger than the cup holder, the cup won't fit into the opening.

To remedy the problems associated with securing cups of varying diameters, cup holders have been provided with larger diameter openings having securing means disposed therein. The improved cup holders ensure that even large cups can fit in the cup holders, while smaller cups can be securely held with a reduced risk of tipping.

Two demonstrative mechanisms for securing cups with smaller diameters are shown in FIGS. 1A and 1B. The cup holders of FIGS. 1A and 1B secure cups with biased tabs disposed within the cup holder opening. The tabs are provided by defining holes along the inner wall of the cup holder opening and having the tabs project therefrom. The tabs are spring mounted to be biased toward the center of the cup holder. However, conventional embodiments of these tabs create new problems with the holding of cups in a vehicle.

The embodiment shown in FIG. 1A illustrates a cup holder 1 having a tab 3 rotatably attached to a pivot pin 5. The cup holder 1 has a cylindrical opening 7, with a bottom wall 9 and a cylindrical wall 11. The cylindrical wall 11 defines a tab hole 13, the tab hole 13 being sized to receive the tab 3. A tab top end 3a is secured to the pivot pin 5 and a tab bottom end 3b is unsecured. The attachment of the tab 3 to the pivot pin 5 allows the tab 3 to rotate in both an upward and downward direction. The tab 3 is biased into an upper position in which the tab extends into the opening 7 by a torsion spring 15, which is attached at one end to the pivot pin 5 and at another end to the tab top end 3a. A top wall portion 17 above the tab opening 7 serves as a stop to limit the upward rotation of the tab 3.

When a cup is inserted into the cup holder 1, a downward force is exerted on the tab 3. The downward force causes the tab 3 to rotate in a downward direction about the pivot pin 5, against the bias of the torsion spring 15. The tab bottom end 3b is thereby received within the hole 13 and the amount the tab 3 extends into the opening 7 is reduced. As the tab 3 is biased in an upward direction by the torsion spring 15, the tab 3 presses in a horizontal direction against the cup and thereby secures the cup within the cup holder 1.

With the assembly of FIG. 1A, it can sometimes be difficult to remove the cup from the holder. Specifically, the cup can sometimes get locked into the cup holder. As the cup is removed from the cup holder 1, the cup is lifted in an upward direction. The upward force on the tab 3 does not produce the same horizontal force as a downward force on the tab 3. Consequently, the tab 3 is not pushed further into the hole 13, and therefore does not create additional room for the cup to be removed. This problem is most common when a cup or other beverage container, e.g., a plastic bottle, having a base wider than the rest of the container, is placed in the cup holder 1. The wider base will press upwards into the tab bottom end 3b and push the tab 3 upward, which tends to hold the cup even tighter. In some situations, the tab 3 is prevented from rotating upward by the vertical wall 17, and the further upward force imparted by the cup will not result in the tab 3 moving horizontally further into the hole 13. Thus, as the tab 3 is not depressed to ease removal of the cup, difficulty in removing the container, or even the container getting locked into the cup holder 1, can result.

A further known arrangement is shown in FIG. 1B, wherein a cup holder 20 has a cylindrical opening 22 formed by a cylindrical wall 24 and a bottom wall 26. The cylindrical wall 24 defines a hole 28 through which a tab 30 extends. The tab 30 is mounted and biased towards the center of the opening 22 by a coil spring 32, and the coil spring 32 is mounted to an internal wall 34 of the cup holder 20. As mounted, the tab 30 is movable in a horizontal direction through the hole 28. Thus, when a cup is inserted into the cup holder 20, the tab 30 moves further into the hole 28 while remaining biased towards the center of the opening 22 by the coil spring 32. Thus, the tab 30 moves to create extra room for the cup while still pressing against the cup to secure the cup within the cup holder 20.

Unfortunately, since the cup is inserted and removed from the cup holder 20 in a vertical direction and the tab 30 is only designed to move in a horizontal direction, insertion and removal problems arise. In order to reduce these problems, the tabs 30 have been formed with a curved side facing the interior of the cup holder 20 to help translate the vertical motion into a horizontal force. However, it has been found that cups of larger diameter still have difficulty pushing the tab 30 horizontally if the base of the cup is too wide to catch the curved portion of the tab 30.

Therefore, there is a need in the art for a cup holder that can accommodate cups of varying diameters, and adequately secure the cups to prevent the cups from tipping, without the problems associated with the securing mechanisms of conventional cup holders.

SUMMARY OF THE INVENTION

The present invention is directed towards a cup holder securing mechanism utilizing a tab structure that can receive and adequately secure cups of varying diameter within the cup holder opening. The tabs of the securing mechanism are biased toward a center of the cup holder opening and can be pushed into holes defined along an inner face of the cup holder opening.

According to the present invention, a cup holder includes a cylindrical wall and a bottom wall that cooperate to define a cylindrical opening. The cylindrical wall defines at least one cup holder hole through which a biased tab extends. The tab has a rounded front side facing the center of the cup holder opening. A back side of the tab is mounted via a torsion spring to a pivot post. The tab is slidably movable in a horizontal direction toward the post and can rotate vertically about the post.

By allowing the tab to move in a horizontal direction and to rotate vertically around the horizontal pivot post, a cup may be securely yet releasably held within the cup holder.

BRIEF DESCRIPTION OF THE DRAWINGS

These and further features of the present invention will be apparent with reference to the following figures and description, wherein:

FIG. 1A illustrates a cup holder of the prior art;
FIG. 1B illustrates an alternate prior art cup holder;
FIG. 2A is a perspective view of the cup holder;
FIG. 2B is a top view of a cup holder;
FIG. 5A shows the tab structure of the present invention in a neutral or at-rest position;
FIG. 5B shows the tab structure when the tab is pushed in.

DETAILED DESCRIPTION OF THE INVENTION

Figure 3:
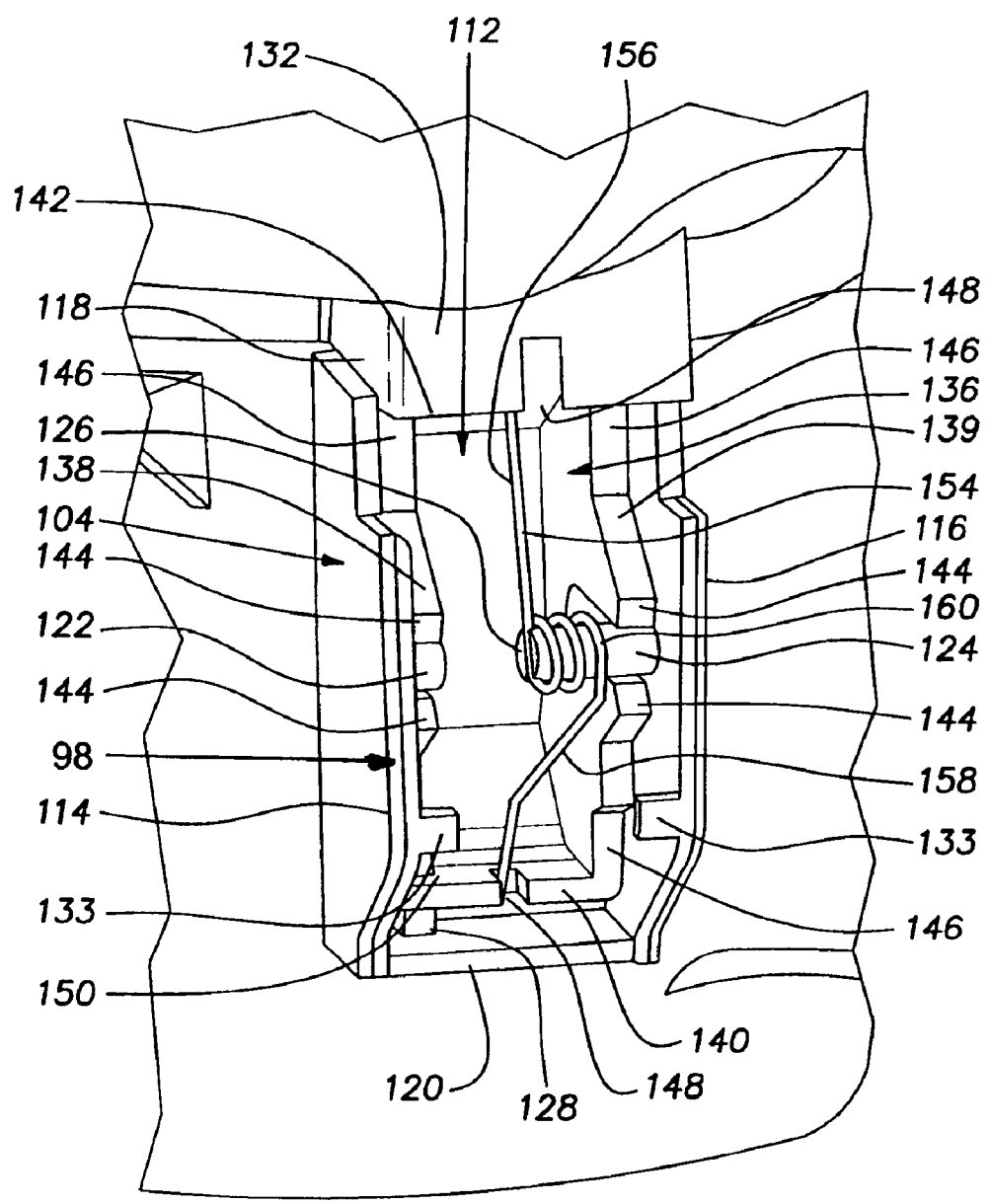
FIG. 3 is a perspective view of an interior of a tab structure of the cup holder.

The present invention will be described in accordance with its preferred embodiments, and as illustrated in the figures. The description with reference to the figures is intended to simplify the explanation of the invention and is not meant to limit the scope of the invention.

The present invention seeks to solve the problems associated with conventional cup holder tab assemblies. With reference to FIGS. 2A and 2B, an embodiment of a cup holder with an improved tab structure is shown. A cup holder 100 includes a main body 101 and a plurality of tab assemblies 98, each of the tab assemblies comprising a tab 112 and a biasing member or spring 154.

The main body 101 has a pair of cylindrical openings 102 formed therein, and supports or receives a plurality of tab assembly supporting structures 104. Each cylindrical opening 102 has a diameter large enough to receive a cup with a relatively large diameter, and a depth sufficient to provide adequate support for tall cups. The precise diameter and depth of the cylindrical opening 102 is determined based on an analysis of cup sizes. Each cylindrical opening 102 is defined by a cylindrical wall 106 and a bottom wall 108. The cylindrical wall 106 extends upwardly from the bottom wall 108 and is vertically oriented so as to be perpendicular to the bottom wall 108, the bottom wall 108 being generally horizontally oriented.

The cylindrical wall 106 defines a plurality of tab openings 110. While three tab openings 110 are preferred and illustrated, it is considered apparent that the exact number of tab openings 110 can be varied and still be considered within the scope of the present invention. The tab openings 110 are preferably rectangular in shape, and are sized so that an associated tab 112 can project through the opening with minimal excess space surrounding the tabs 112.

FIG. 2B is a top view of the cylindrical opening 102. The cylindrical opening 102 has a diameter R. The tabs 112, when projecting out of the tab openings 110, define a smaller diameter r within the cylindrical opening 102. The tabs 112 are spring mounted within the cup holder 100 and can be pushed into the tab openings 110, therefore the smaller diameter r can increase until r=R. This enables the cup holder 100 to hold cups having a diameter between R and r. The spring mounting of the tabs 112 is described in more detail below.

Figure 4:
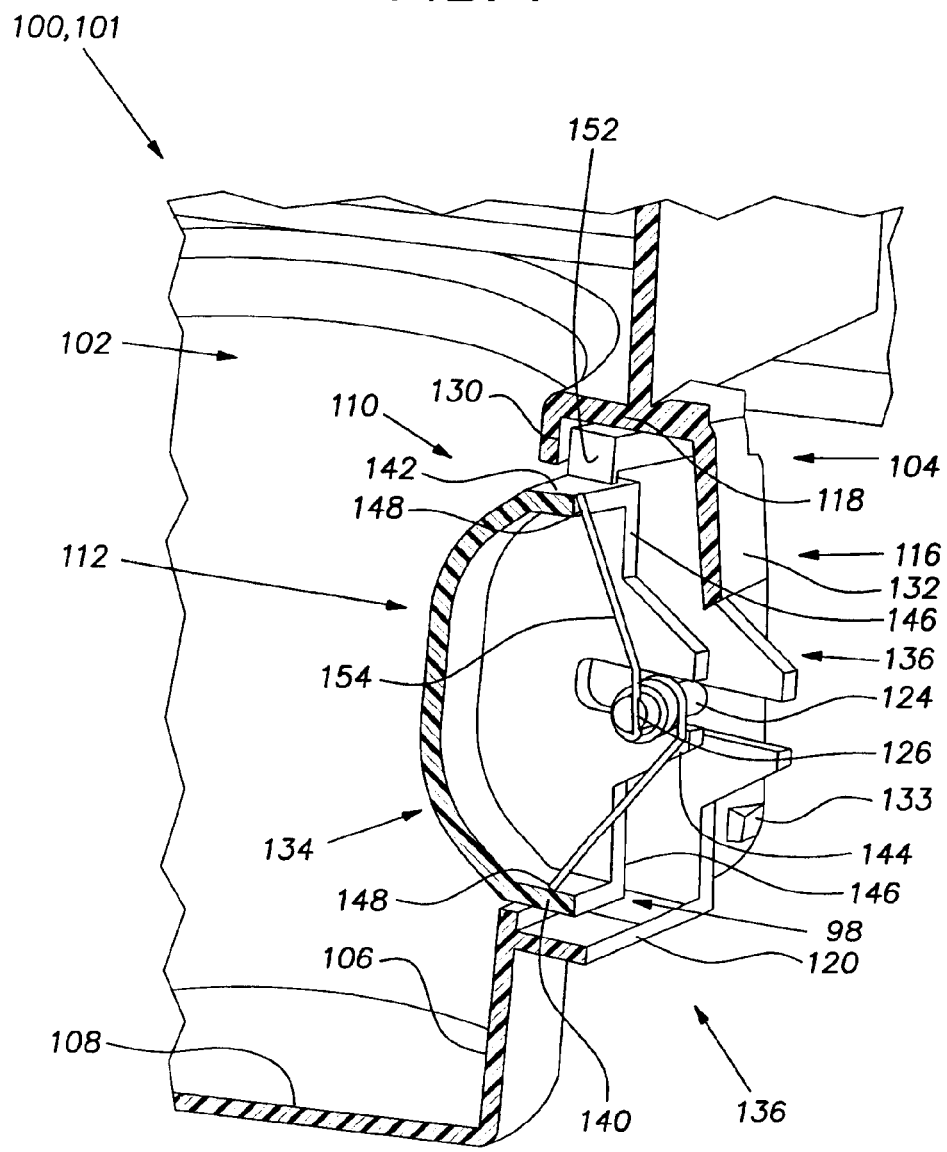
FIG. 4 is a perspective view of portions of the interior of the tab structure of the cup holder.

With reference to FIGS. 3 and 4, the tab assembly supporting structure 104 includes a first vertical wall 114 and a second vertical wall 116 and a top horizontal wall 118 and a bottom horizontal wall 120. The vertical walls 114, 116 are secured to and project from an inner surface of the cylindrical wall 106 and are laterally adjacent to left and right sides of the tab opening 110. Each of the horizontal walls 118, 120 are secured to and project from the inner surface of the cylindrical wall 106. The horizontal walls 118, 120 are disposed a small distance from upper and lower sides of the tab opening 110, such that a lip is formed between the horizontal walls 118, 120 and the tab opening 110.

A first pivot post 122 extends from the first vertical wall 114, and a second pivot post 124 extends from the second vertical wall 116. The pivot posts 122, 124 project perpendicularly from the vertical walls 114, 116 toward the opposite vertical wall 114, 116, and are located substantially centrally along the length of the vertical walls 114, 116. The first pivot post 122 disposed on the first vertical wall 114 is relatively shorter than the second pivot post 124 disposed on the second vertical wall 116. The second pivot post 124 is cylindrically shaped, with a flat head having a circular cross-section. The flat head of the second post 124 defines an engagement notch 126 to which a spring 154 is secured, as will be described in detail below.

Further, each of the vertical walls 114, 116 provide a leg 133 projecting perpendicularly from the edge of the vertical walls 114, 116 situated away from the tab opening 110, adjacent to the pivot posts 122, 124. The legs 133 are disposed vertically below the pivot posts 122, 124 and vertically above the bottom horizontal wall 120, and each leg 133 extends toward the opposing vertical wall 114, 116.

The bottom horizontal wall 120 provides a stopper protrusion 128. The stopper protrusion 128 extends vertically upward from the bottom horizontal wall 120, and interacts with the tab 112 so as to restrict the tab 112 motion, as will be described further below.

The top horizontal wall 118 is slightly elevated above the tab opening 110 top edge. The top horizontal wall includes a vertically recessed portion that serves as a tab catcher 130. The tab catcher 130 is a vertical portion which extends adjacent the top horizontal wall 118 near the tab opening 110. The tab catcher 130 serves as a stopper to limit the extension of the tab 112 out of the cylindrical opening 102. The tab catcher 130 cooperates with a tab post 152, the tab post 152 being secured to the tab 112. As the tab 112 extends out of the cylindrical opening 102, the tab post 152 contacts the tab catcher 130 and thereby prevents further movement of the tab 112 out of the cylindrical opening 102.

A limit wall 132 is disposed at an end of the top horizontal wall 118 away from the tab opening 110 so as to contact the tab 112 when the tab 112 is pushed into the tab opening 110, and thereby limit movement of the tab 112 into the tab opening 110, as will be discussed further below.

The tabs 112 include a rounded front face 134 and a backside 136. The rounded front face 134 projects into the cylindrical opening 102 and engages the cup. The backside 136 of the tab 112 is connected to the main body 101 through the tab assembly supporting structures 104.

The backside 136 of the tab 112 includes two vertical walls 138, 139 and two horizontal walls 140, 142 that project perpendicularly from the backside 136 of the tab 112, along the edges of the tab 112. The two vertical walls 138, 139 are spaced from one another so as to be in sliding contact with the vertical walls 114, 116 of the tab assembly supporting structure 104. Further, the two vertical walls 138, 139 each define a pivot post engaging slot 144 and leg engaging surfaces 146. The pivot post engaging slots 144 define an opening sized slightly larger than the diameter of the associated pivot posts 122, 124. The pivot posts 122, 124 are slidably received within the pivot post engaging slots 144, and, through this engagement, the pivot posts 122, 124 guide the movement of the tab 112.

The leg engaging surfaces 146 are disposed along the vertical edge surfaces of the vertical walls 138, 139 and are situated directly above and below the pivot post engaging slots 144. Each leg engaging surface 146 below the pivot post engaging slot 144 is adapted to abut the leg 133 projecting from the corresponding vertical wall 114, 116 of the tab assembly supporting structure 104. The leg engaging surface 146 above the pivot post engaging slot 144 is adapted to abut the top horizontal wall limit wall 132.

The horizontal walls 140, 142 each define a spring engagement notch 148 that is adapted to receive an associated end of the spring 154. Further, the bottom horizontal wall 140 defines a stopper receiving hole 150. The stopper receiving hole 150 receives the stopper protrusion 128 attached to the bottom horizontal wall 120 of the tab assembly supporting structure 104. The stopper receiving hole 150 extends a length sufficient to allow a full desired range of motion of the tab 112 before the stopper protrusion 128 contacts either end of the stopper receiving hole 150. The stopper receiving hole 150 and the stopper protrusion cooperate to limit the movement of the tab 112 both out of and into the tab opening 110.

The top horizontal wall 142 of the tab 112 includes a tab post 152 extending vertically from the top surface of the top horizontal wall 142. The tab post 152 is adapted to abut the tab catcher 130 when the tab 112 is projecting a maximum desired amount out of the tab opening 110. Through this abutment, the tab 112 is prevented from extending further than desired through the tab opening 110 into the cylindrical opening 102. The tab post 152 and the tab catcher 130 cooperate with the stopper receiving hole 150 and the stopper protrusion 128 and the legs 133 to limit the movement of the tab 112 in both a horizontal direction and vertically about the pivot posts 122, 124, while providing the tab 112 with a desired range of motion.

In the preferred and illustrated embodiment, the spring 154 is a torsion spring, and includes an upper spring portion 156, a lower spring portion 158, and a middle spring portion 160. The upper spring portion 156 is received in the spring engagement notch 148 in the top horizontal wall 142 of the tab 112. The bottom spring portion 158 is received in the spring engagement notch 148 in the bottom horizontal wall 140 of the tab 112. The middle spring portion 160 wraps around the second pivot post 124, and then extends through the pivot post engagement notch 126.

The torsion spring 154 biases the tab 112 to extend out of the tab opening 110. Further, the torsion spring 154 biases the tab 112 to a neutral position where the tab 112 is not rotated in an upward or downward direction. The walls 114, 116, 118, 120 of tab assembly supporting structure 104 cooperate with the pivot posts 122, 124 and the engaging slots 144 to serve as guides for the motion of the tab 112, while the stopper portions 128, 130, 150, 152 serve to limit the motion of the tab 112.

As mention above, each tab 112 is movable in a horizontal direction into and out of the tab opening 110, and is rotatable in a vertical direction about the pivot posts 122, 124. As the tab 112 moves into the tab opening 112 and rotates up or down about the pivot posts 122, 124, the torsion spring 154 resists the motion in that particular direction, such that when no force is acting upon the tab 112, the tab 112 is extended to a maximum extent as allowed by the stoppers 128, 130 through the tab opening 110 and is not pivoted about the posts 140, 142.

Figures 5A, 5B:
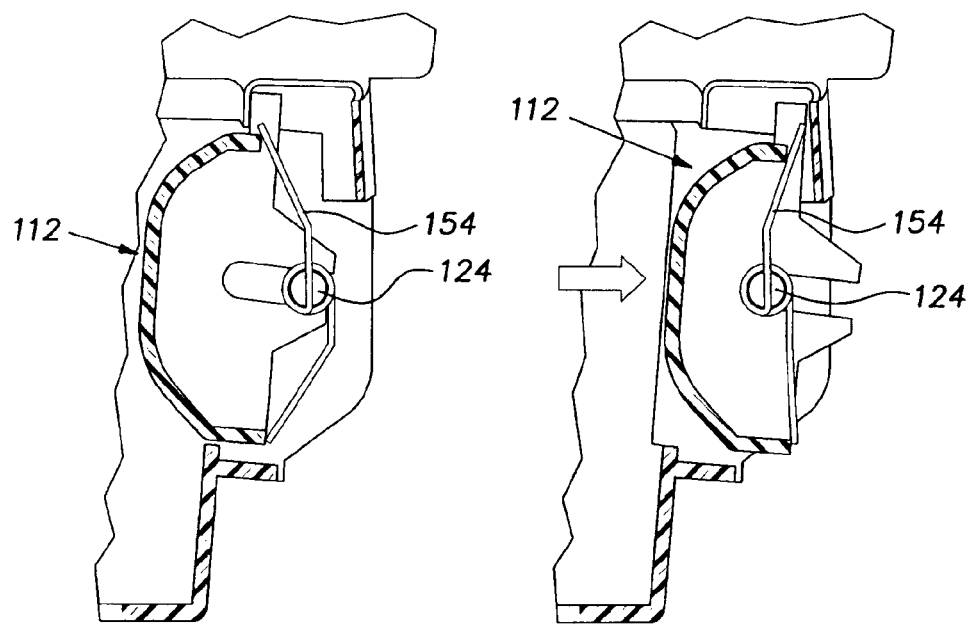

With reference to FIGS. 5A-5D, the operation of the tab assemblies 98 in securing a cup within the cup holder 100 will be explained. In FIG. 5A, the tab 112 is in a neutral position. When in a neutral position, the tab 112 is fully extended through the tab opening 110 in the cylindrical wall 106 and is not pivoted in an upward or a downward direction.

FIG. 5B shows the tab 112 when a horizontal force in the direction of the arrow is applied. The force represents the cup being present or inserted in the cup holder 100. The tab 112 is pushed further into the tab opening 110, so less of the rounded front face 134 of the tab 112 projects out of the tab opening 110. When this happens, the pivot post engaging slots 144 on the vertical walls 138, 139 of the tab 112 move relative to the pivot posts 122, 124, so that pivot posts 122, 124 are now further received within the pivot post engaging slots 144. As such, the torsion spring 154 is tensioned to bias the tab 112 in a direction out of the tab opening 110. It is important to note that the motion of the tab 112 in the direction of the arrow (into the tab opening 110) is limited by both the legs 133 and the pivot posts 122, 124. Thus, the length of the pivot post engaging slots 144 and the position of the posts 122, 124 should be arranged so as to allow the tab 112 to have a full range of motion (R-r).

Figures 5C, 5D:
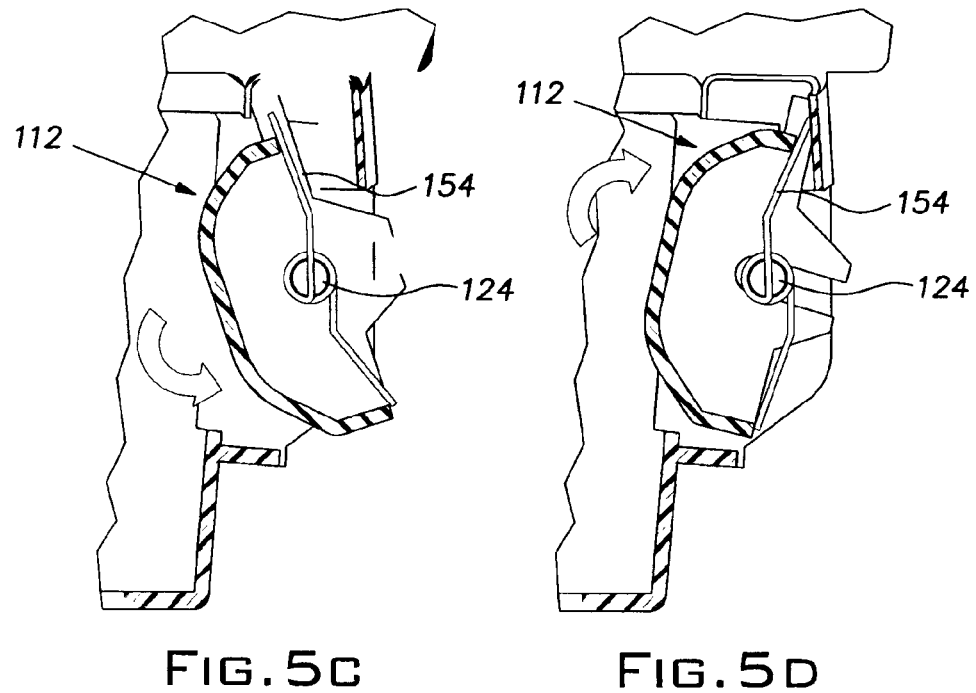
FIG. 5C shows the tab pivoted downward.
FIG. 5D shows the tab pivoted upward.

FIG. 5C shows the tab 112 partially depressed and rotated in a downward, vertical direction. The tab 112 rotates about the pivot posts 122, 124 in a downward direction so that a greater portion of the lower side of the rounded front face 134 of the tab 112 is received within the tab opening 110 and a greater portion of the top side of the rounded front face 134 of the tab 112 extends out of the tab opening 110. FIG. 5D shows the tab 112 partially depressed and rotated in an upward, vertical direction. Once again the tab 112 rotates about the pivot posts 122, 124, however this time a greater portion of the lower side of the rounded front face 134 extends out of the tab opening 110 and a larger portion of the top side of the rounded front face 134 is received within the tab opening 110. It is important to note that whenever the tab 112 is pivoted up or down from the neutral position, the torsion spring 154 biases the tab 112 back toward the neutral position.

When a cup is inserted into the cup holder 100, the tab 112 experiences a force in both the horizontal direction into the tab opening 110 and in the vertical direction towards the bottom wall 108. Thus, during insertion of a cup, the tab 112 may be in a state resembling that of FIG. 5C, where the tab 112 is pushed into the tab opening 110 and is rotated in a downward direction. When the cup is at rest within the cylindrical opening 102, the tab 112 may be in the condition shown in FIG. 5B, where the tab 112 is pushed into the tab opening 110 but is not rotated in either vertical direction. While the cup is being removed from the cup holder 100, the tab 112 may be in the condition shown in FIG. 5D, where the tab 112 is pushed into the tab opening 110 and is rotated upward. Following removal of the cup, the tab 112 returns to a neutral position, shown in FIG. 5A.

It should be apparent to one skilled in the art that the present invention is amenable to modification beyond the structure described in the above preferred embodiment. For example, a different number of tabs can be utilized, and the tabs can be attached to the cup holder in various methods while staying consistent with the scope of the present invention.

What is claimed is:

1. A cup holder for a vehicle, the cup holder having a cylindrical wall and a bottom wall that cooperate to define a cylindrical opening, the cup holder comprising:
   a plurality of tab openings formed in the cylindrical wall;
   a plurality of tabs, each of said tabs being associated with and adapted to extend through one of said tab openings;
   a plurality of pivot portions secured to said cylindrical wall, each of said pivot portions being associated with one of said openings and including a stationary pivot post and having one of said tabs moveably mounted on the pivot post; and a spring operably connecting each of said tabs to said associated pivot portion, wherein the tabs are mounted to the associated pivot portion so as to move horizontally relative to the associated pivot portion and rotate in a vertical direction about the associated pivot portion, wherein the spring biases the tab to a neutral tab position, the neutral tab position being a position in which the tab extends to a maximum extent from the associated opening and a top end of the tab and a bottom end of the tab extend from said associated opening an equal amount.

2. The cup holder for a vehicle according to claim 1, wherein each pivot portion comprises a support wall, said pivot post extending from said support wall, said support wall being secured to said cylindrical wall adjacent to the associated tab opening and on a side surface of said cylindrical wall opposite the cylindrical opening.

3. The cup holder for a vehicle according to claim 2, wherein a central portion of the spring engages said associated pivot post, a top portion of the spring engaging the top end of the associated tab, and a bottom portion of the spring engaging the bottom end of the associated tab.

4. The cup holder for a vehicle according to claim 1, wherein the cylindrical wall provides at least one protrusion disposed on a side of said cylindrical wall opposite the cylindrical opening, the protrusion disposed at a back side of said tab and being adapted to abut said tab so as to limit both sliding and rotary movement of the tab.

5. The cup holder of claim 1, wherein each tab includes an elongated opening for receiving the pivot post.

6. A cup holder for a vehicle, the cup holder having a cylindrical wall and a bottom wall that cooperate to define a cylindrical opening, the cup holder comprising:
    a plurality of tab openings formed in the cylindrical wall;
    a plurality of tabs, each of said tabs being associated with, and adapted to extend through, one of said tab openings;
    a plurality of horizontal guides, each of said horizontal guides being secured to a side of the cylindrical wall opposite the cylindrical opening and being associated with one of said tab openings and guiding one of said tabs;
    a plurality of pivot portions, each pivot portion being secured to an associated horizontal guide and pivotably engaging an associated tab, the pivot portions being stationary posts that extend from the associated horizontal guide, the tabs being movably mounted on the stationary posts; and
    a plurality of biasing members, each of said biasing members being associated with one tab, operably connecting each of said tabs to said associated horizontal guide and pivot portion, each biasing member biasing each tab to a neutral tab position, wherein the neutral tab position is a position where the tab extends a maximum amount from the associated tab opening and a top end of the tab and a bottom end of the tab equally extend from said tab opening.

7. The cup holder according to claim 6, wherein a back side of the tab comprises two projecting legs, wherein the two legs are spaced from one another a distance at least as large as a diameter of the stationary post, and the stationary post is disposed between the two legs.

8. The cup holder according to claim 7, wherein the biasing member is a torsion spring, wherein a central portion of the torsion spring is wrapped around and connected to the stationary post, a top portion of the torsion spring is connected to the top end of the tab, and a bottom portion of the torsion spring is connected to the bottom end of the tab.

9. The cup holder of claim 6, wherein the horizontal guides are configured to engage the tabs for limiting both sliding and pivotal movement of the tabs within the tab openings.

10. A cup holder for a vehicle, the cup holder having a cylindrical wall and a bottom wall that cooperate to define a cylindrical opening, the cup holder comprising:
    at least one tab opening formed in the cylindrical wall;
    at least one tab assembly operatively associated with the at least one tab opening, the at least one tab assembly including:
        a housing mounted to the cylindrical wall and configured to at least partially frame the tab opening, the housing including first and second side walls, a top wall and a bottom wall, each side wall including an inwardly projecting post,
        a tab having a front wall and first and second side walls, the first and second side walls of the tab being located adjacent the respective first and second side walls of the housing and being configured to engage the posts, the tab horizontally and pivotally moving within the tab opening about the posts, and
        a biasing members operatively connected to both the housing and the tab, the biasing member biasing the tab to a neutral tab position.

11. The cup holder according to claim 10, wherein each of the first and second side walls of the tab includes a slot dimensioned to receive the post of the respective first and second side walls for the housing.

12. The cup holder of claim 10, wherein the housing top wall is configured to engage the tab for limiting both horizontal and pivotal movement of the tab.

13. The cup holder of claim 12, wherein the housing top wall includes a forward portion configured to limit horizontal movement of the tab into the cylindrical opening and limit pivotal movement of the tab in a first direction.

14. The cup holder of claim 13, wherein the housing top wall includes a rear portion configured to limit horizontal movement of the tab out of the cylindrical opening and limit pivotal movement of the tab in a second opposite direction.

15. The cup holder of claim 14, wherein the tab includes a projection for engaging both the forward and rear portions of the housing top wall.

16. The cup holder of claim 10, wherein at least one of the housing first and second side walls includes an inwardly extending leg, the leg engaging the tab for limiting both horizontal and pivotal movement of the tab.

17. The cup holder of claim 10, wherein the housing bottom wall includes an upwardly extending protrusion, the protrusion engaging the tab for limiting both horizontal and pivotal movement of the tab.

18. The cup holder of claim 17, wherein the tab includes an opening dimensioned to receive the protrusion of the housing bottom wall.

19. The cup holder of claim 10, wherein the tab front wall includes an upper end portion and a lower end portion, the biasing member being mounted to one of the posts of the housing first and second side walls and engaging both the upper and lower end portions of the tab front wall.

20. The cup holder of claim 19, wherein the biasing member is a torsion spring, a central portion of the torsion spring being connected to the post, a top portion of the torsion spring being received in an opening located on the upper end portion, a bottom portion of the torsion spring being received in an opening located on the lower end portion.

* * * * *